(12) United States Patent
Mihlbauer et al.

(10) Patent No.: US 11,432,536 B2
(45) Date of Patent: Sep. 6, 2022

(54) AQUARIUM CONVERSION SYSTEMS

(71) Applicant: CENTRAL GARDEN & PET COMPANY, Walnut Creek, CA (US)

(72) Inventors: Brad L. Mihlbauer, Mukwonago, WI (US); Phillip C. Bartoszek, New Berlin, WI (US)

(73) Assignee: CENTRAL GARGEN & PET COMPANY, Walnut Creek, CA (US)

( * ) Notice: Subject to any disclaimer, the term of this patent is extended or adjusted under 35 U.S.C. 154(b) by 23 days.

(21) Appl. No.: 17/017,874

(22) Filed: Sep. 11, 2020

(65) Prior Publication Data
US 2022/0079124 A1  Mar. 17, 2022

(51) Int. Cl.
*A01K 63/00* (2017.01)
*A01K 1/00* (2006.01)

(52) U.S. Cl.
CPC .......... *A01K 63/006* (2013.01); *A01K 1/0058* (2013.01)

(58) Field of Classification Search
CPC .. A01K 63/003; A01K 63/006; A01K 1/0058; A01K 1/0064; A01G 9/16; A01G 9/20; B60R 13/06
See application file for complete search history.

(56) References Cited

U.S. PATENT DOCUMENTS

| | | | | |
|---|---|---|---|---|
| 5,344,205 A | * | 9/1994 | Yada | B60J 10/22 296/208 |
| 5,553,428 A | * | 9/1996 | Watanabe | B60J 10/22 296/154 |
| 6,227,598 B1 | * | 5/2001 | Ichioka | B60R 13/04 296/93 |
| 7,210,729 B2 | * | 5/2007 | Hammaker | B60J 10/72 296/146.15 |
| 10,569,631 B1 | * | 2/2020 | Williams | B60J 10/242 |
| 2001/0042347 A1 | * | 11/2001 | Kasinger | A01G 9/16 52/79.4 |
| 2006/0188739 A1 | * | 8/2006 | Imai | B60J 10/21 428/516 |
| 2008/0028700 A1 | * | 2/2008 | Wu | A01G 9/16 52/200 |
| 2017/0094954 A1 | * | 4/2017 | Keller | A01K 63/006 |
| 2019/0161958 A1 | * | 5/2019 | Barsheshet | E04B 1/40 |

* cited by examiner

*Primary Examiner* — Monica L Barlow
*Assistant Examiner* — Madeline L Douglas
(74) *Attorney, Agent, or Firm* — Grossman, Tucker, Perreault & Pfleger, PLLC

(57) ABSTRACT

A system to convert a framed, open-top, aquarium to a terrarium or vivarium is provided. An attachment device includes a core member having a sidewall groove to accept the insertion of an enclosure sidewall and an aquarium flange groove to accept the insertion of a flange extending from the interior surface of an aquarium frame.

25 Claims, 11 Drawing Sheets

AQUARIUM CONVERSION SYSTEMS

FIELD

The present disclosure relates to terrariums or vivariums, more specifically to systems useful for converting a framed aquarium to a terrarium or vivarium.

BACKGROUND

When maintained as pet, many reptiles, such as iguanas and chameleons, prefer an environment (i.e., an enclosure or vivarium) that includes space for climbing and objects to climb upon. Similarly, terrariums frequently benefit from an increased height to encourage plant growth. While widely available, framed aquariums are often relatively short in height and relatively wide to provide a form factor that facilitates the lateral movement of aquatic pets such as fish or turtles. Thus, commercially available vivariums and terrariums are frequently taller than a standard, framed, open top aquarium. It would be desirable to stand a commercially available, framed, aquarium on end to provide increased height and enclose the open top of the aquarium with a system than permits the use of a reptile or plant substrate without leakage of the substrate, and which provides easy access for interaction with the reptile, feeding, and housekeeping activities.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1A:
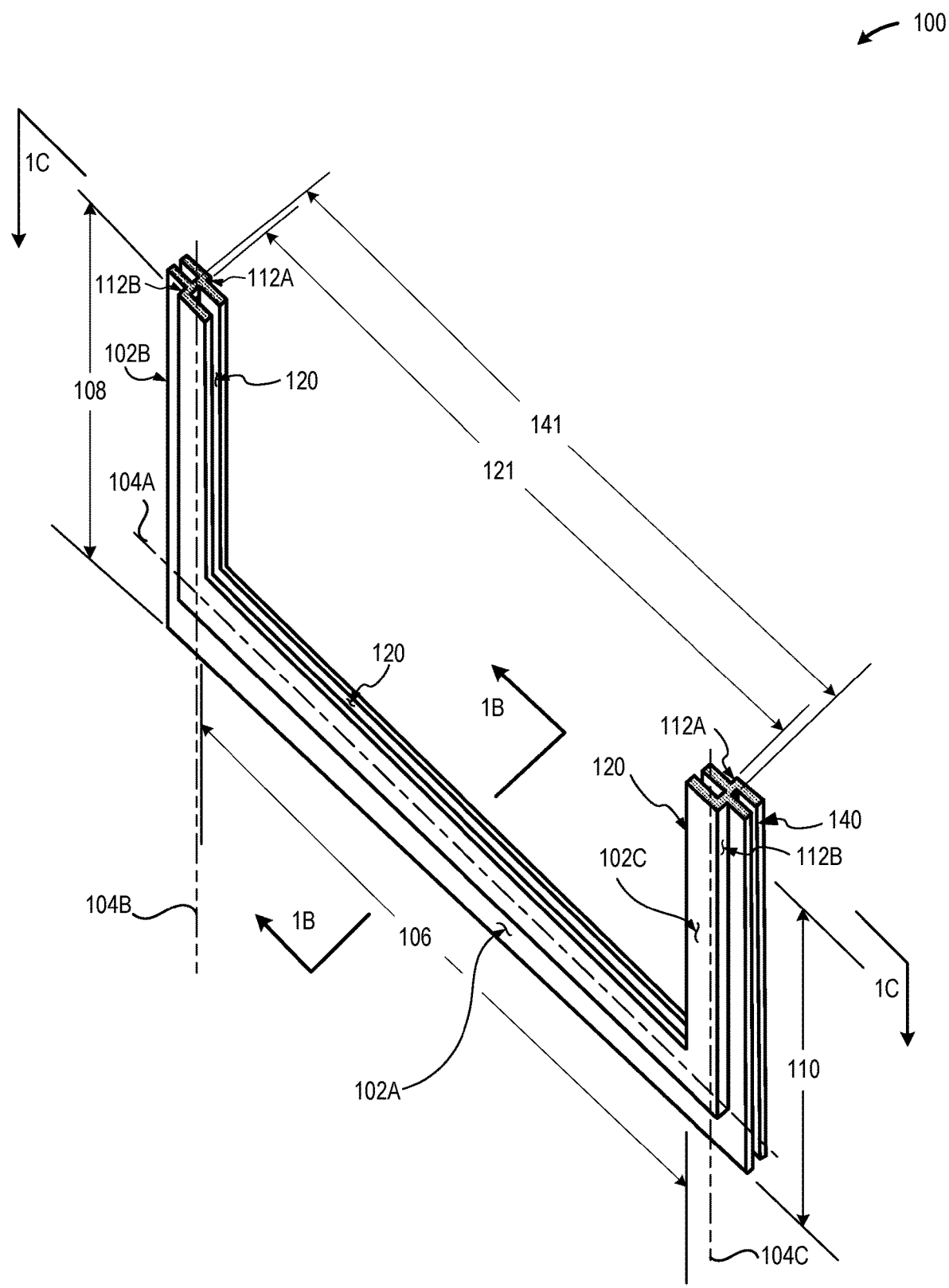
FIG. 1A is a perspective view of an illustrative attachment device that includes a central portion, a first upturned portion at a first end of the central portion, and a second upturned portion at a second end of the central portion to form an attachment device having an sidewall groove on at least a portion of the interior surface of the attachment device and an aquarium flange groove on at least a portion of the interior surface of the attachment device, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein provide the ability to convert a standard framed aquarium to an upright vivarium or terrarium capable of retaining a reptile or plant substrate. This is preferably achieved without leakage and preferably without requiring the use of sealants or adhesives that extend about the full perimeter of the frame disposed about the open top of a standard framed aquarium. A standard framed aquarium includes a frame that wraps around the top edge of the glass aquarium walls and typically extends about the entire top perimeter of the aquarium. A flange extends from the frame inside of the aquarium, providing a "ledge" proximate the top edge of the aquarium for mounting a hood or similar fixtures when the aquarium is used as a home for aquatic pets. When an aquarium is stood on end, the open top of the aquarium becomes an open side. The systems and methods disclosed herein use an attachment device having a first surface and a transversely opposed second surface, preferably a "U" shaped attachment device in which the first surface provides a generally inward facing surface and the second surface provides a generally outward facing surface, that extends along the "bottom" of the open aquarium side and partially up the "walls" of the open aquarium. The flange extending from the interior surface of the frame of the aquarium fits into a groove formed on the second surface of the attachment device, retaining the attachment device within the aquarium.

The first surface of the attachment device includes a sidewall groove to accept the insertion of an enclosure sidewall that preferably includes one or more ventilation grids and preferably a door to access the interior space within the vivarium/terrarium. The enclosure sidewall preferably has a first relatively narrower width to fit within the groove on the first surface of the attachment device and a second relatively wider width to overlap the flange on the interior surface of the frame disposed about the edge of the aquarium. Additional attachment features are preferably included, such as rotatable latches, operably coupled to the enclosure sidewall to secure the enclosure sidewall to the flange and thus, to the aquarium. By preferably sealing between the enclosure sidewall and the aquarium frame, the attachment device minimizes or even eliminates the leakage of substrate from the vivarium or terrarium. Preferably, since no adhesives or sealants are used to attach the enclosure sidewall to the aquarium frame, the enclosure sidewall may be removed at any time without damaging the aquarium, thereby allowing reuse of the aquarium.

An attachment device for an aquarium is provided. The attachment device may include: a flexible member that includes: a central portion having a first length along a first longitudinal axis; a first upturned end portion having a second length along a second longitudinal axis; and a second upturned end having a third length along a third longitudinal axis; wherein the central portion, the first upturned end portion, and the second upturned end portion form a core member having an interior surface and a transversely opposed exterior surface; a sidewall groove having a first depth and a first width formed along at least a portion of the interior surface of the core member, the sidewall groove to accommodate the slidable insertion of at least a first portion of a sidewall member having a first thickness; an aquarium flange groove having a second depth and a second width formed along the exterior surface of the core member, the aquarium flange groove to accommodate the slidable insertion of a framed aquarium flange having a second thickness; wherein a first plane formed by the centerline of the sidewall groove and a second plane formed by the centerline of the aquarium flange groove are offset.

A system for converting a framed open top aquarium to a front-opening terrarium or vivarium is provided. The system may include: an enclosure sidewall that includes: a sidewall member; at least one door aperture formed in the sidewall member; an outward opening door member pivotably coupled to the sidewall member and disposed at least partially in the door aperture when in a closed position; and an attachment device comprising a flexible member that includes: a central portion having a first length along a first longitudinal axis, a first upturned end portion having a second length along a second longitudinal axis, and a second upturned end portion having a third length along a third longitudinal axis that form a core member having an interior surface and a transversely opposed exterior surface; a sidewall groove that extends along at least a portion of the interior surface of the core member, the sidewall groove having a first depth and a first width to accommodate the slidable insertion of at least a portion of a peripheral edge of a first portion of the sidewall member; an aquarium flange groove formed along the at least a portion of the exterior surface of the core member, the aquarium flange groove having a second depth and a second width to accommodate the slideable insertion of at least a portion of a framed aquarium flange that extends from an interior surface of a frame disposed about an aquarium.

Another attachment device for an aquarium is provided. The attachment device may include: a flexible member that includes: a central portion having a first length along a first longitudinal axis; a first upturned end portion having a second length along a second longitudinal axis; and a second upturned end having a third length along a third longitudinal axis; wherein the central portion, the first upturned end portion, and the second upturned end portion form a core member having an interior surface and a transversely opposed exterior surface; a sidewall groove having a first depth and a first width formed along at least a portion of the interior surface of the core member, the sidewall groove to accommodate the slidable insertion of at least a first portion of a sidewall member having a first thickness; an aquarium flange groove having a second depth and a second width formed along the exterior surface of the core member, the aquarium flange groove to accommodate the slidable insertion of a framed aquarium flange having a second thickness; wherein a first plane formed by the centerline of the sidewall groove and a second plane formed by the centerline of the aquarium flange groove are coplanar.

As used herein, the term "longitudinal axis" refers to the principal axis along the longest dimension of an object. Thus, for the attachment device, the longitudinal axis of the flexible member will extend along the center of the core member. For the portion of the attachment device referred to as the "central portion," the longitudinal axis will extend generally parallel to the "bottom" of the aquarium, for the portion of the attachment device referred to as the "first upturned portion" the longitudinal axis will extend generally parallel to the first sidewall of the aquarium, and for the portion of the attachment device referred to as the "second upturned portion" the longitudinal axis will extend generally parallel to the second sidewall of the aquarium. It should be noted that a single attachment device may therefore have a plurality of "longitudinal" axes.

Figure 1B:
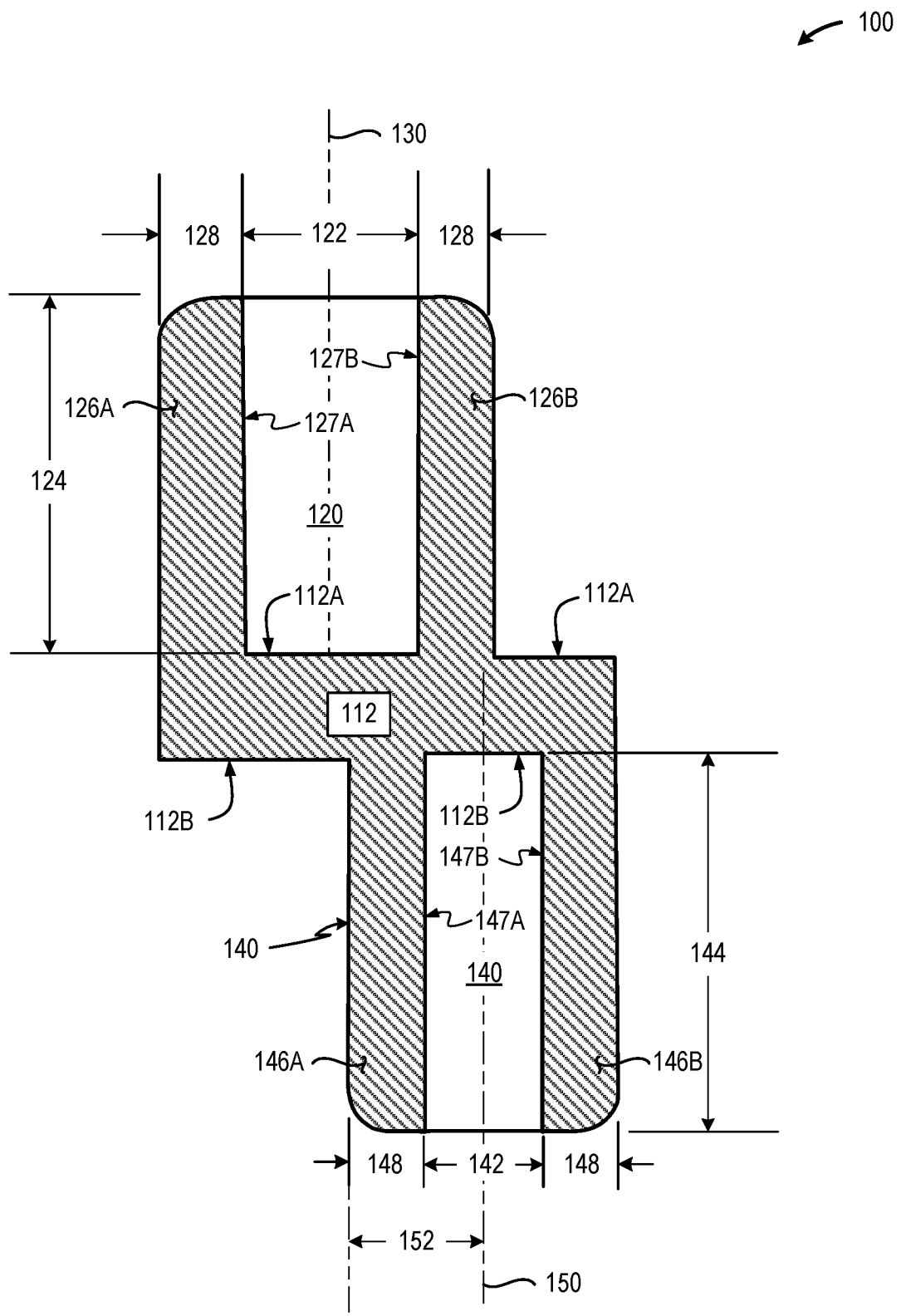
FIG. 1B is a transverse cross-sectional elevation of the illustrative attachment device depicted in FIG. 1A, along sectional line 1B-1B, in accordance with at least one embodiment described herein.
Figure 1C:
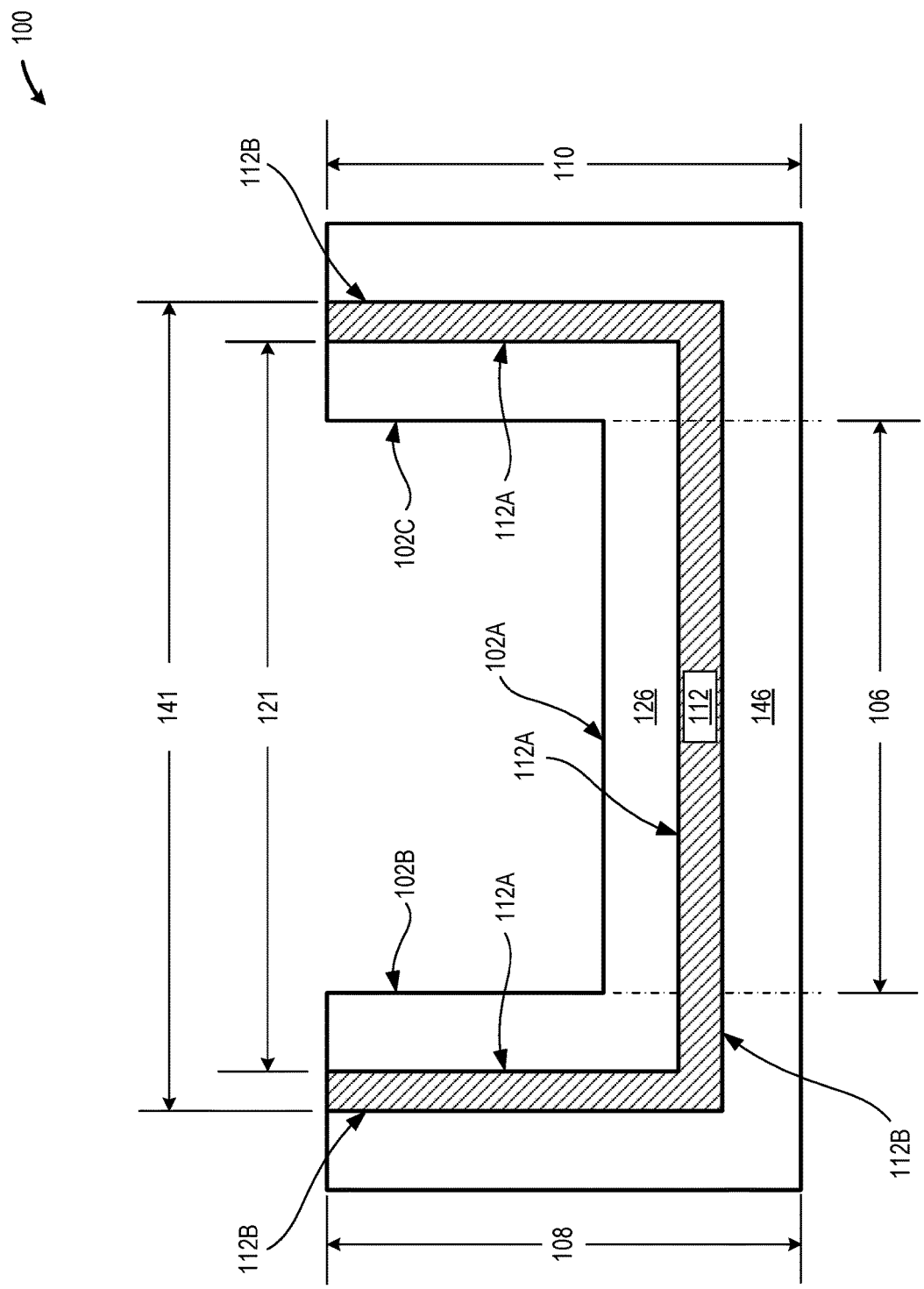
FIG. 1C is a longitudinal cross-sectional elevation of the illustrative attachment device depicted in FIG. 1A, along sectional line 1C-1C, in accordance with at least one embodiment described herein.

FIG. 1A is a perspective view of an illustrative attachment device 100 that includes a central portion 102A, a first upturned portion 102B at a first end of the central portion 102A, and a second upturned portion 102C at a second end of the central portion 102A to form the attachment device 100 having an internal or sidewall groove 120 on at least a portion of the interior surface of the attachment device 100 and an external or aquarium flange groove 140 on at least a portion of the interior surface of the attachment device 100, in accordance with at least one embodiment described herein. FIG. 1B is a transverse cross-sectional elevation of the illustrative attachment device 100 depicted in FIG. 1A, along sectional line 1B-1B, in accordance with at least one embodiment described herein. FIG. 1C is a cross-sectional elevation of the illustrative attachment device 100 depicted in FIG. 1A, along sectional line 1C-1C, in accordance with at least one embodiment described herein.

With reference to FIGS. 1A-1C, the central portion 102A of the attachment device 100 preferably lies along a central longitudinal axis 104A, the first upturned portion 102B preferably lies along a first longitudinal axis 104B, and the second upturned portion 102C preferably lies along a second longitudinal axis 104C. The central longitudinal axis 104A, the first longitudinal axis 104B, and the second longitudinal axis 104C are preferably coplanar (i.e., all three axes lie in the same plane). The first longitudinal axis 104B and the second longitudinal axis 104C may form the same or different angles with respect to the central longitudinal axis 104A. In embodiments, the first longitudinal axis 104B may form an angle of from about 75° to about 105° measured with respect to the central longitudinal axis 104A. In embodiments, the second longitudinal axis 104C may form an angle of from about 75° to about 105° measured with respect to the central longitudinal axis 104A. In one particularly preferred embodiment, the first longitudinal axis 104B and the second longitudinal axis 104C form an angle of about 90° measured with respect to the central longitudinal axis 104A. As used herein, the term "longitudinal axis" refers to the principal axis along the longest dimension of an object. For example, the central longitudinal axis of the central portion 102A would lie parallel to the sidewall groove 120 and parallel to the aquarium flange groove 140.

Although the attachment device is depicted as preferably having three straight portions (the central portion 102A, the first upturned portion 102B, and the second upturned portion 102C), the attachment device 100 is not limited to three straight portions. In various embodiments, one or more of the central portion 102A, the first upturned portion 102B, and/or the second upturned portion 102C may have a polygonal, arched, radiused, oval, or curved shape. It may also be appreciated that the attachment device may be therefore be described as generally having a "U" shaped configuration. However, it may be appreciated that the first upturned portion 102B and second upturned portion 102C are not necessarily parallel to one another.

The attachment device 100 may have any dimensions to fit any generally square, rectangular, or polygonal framed glass or plastic tank, enclosure, habitat, or aquarium. In general, framed aquariums in the United States are available in standard depths (i.e., distance measured front-to-back) of 6", 8", 10", 12", 13", 18", and 24". Generally, framed aquariums in the United States are available in standard widths (i.e., distance measured side-to-side) of 12", 16", 20", 24", 30", 36", 48", 60", 72", and 84". The central portion 102A of the attachment device 100 may have any length 106, including but not limited to, any of the above listed depth measurements and width measurements. Framed aquariums available worldwide also have standard sizes and one of ordinary skill in the relevant arts will readily appreciate that the central portion 102A of the attachment device 100 may have a length 104A that includes but is not limited to the standard size framed aquariums available worldwide.

The first upturned portion 102B has a length 108 measured along the longitudinal axis 104B and the second upturned portion 102C has a length 110. The length 108 of the first upturned portion 102B and the length 110 of the second upturned portion 102C may be the same or different. In embodiments, the length 108 of the first upturned portion 102B and the length 110 of the second upturned portion 102C may be less than or equal to the length 106 of the central portion 102A. In other embodiments, the length 108 of the first upturned portion 102B and the length 110 of the second upturned portion 102C may be greater than or equal to the length 106 of the central portion 102A.

Referring to FIG. 1B, two sidewalls 126A, 126B (collectively, "sidewalls 126") extending from a first surface 112A of a core member 112 form the sidewall groove 120. Centerline 130 defines the centerline of the sidewall groove 120. The centerline 130 of the sidewall groove 120 defines a sidewall plane. The sidewall groove 120 has an internal width 121 (i.e., the width measured from the first surface 112A of the core member 112 forming the first upturned portion 102B to the first surface 112A of the core member 112 forming the second upturned portion 102C) to accommodate the slidable insertion of an enclosure sidewall (not shown in FIGS. 1A-1C). Although not depicted in FIGS. 1A-1C, in some embodiments, a reinforcing member may be disposed embedded, or otherwise encapsulated in the core member 112 to provide reinforcement against the shear forces exerted on the core member 112 by the weight of the enclosure sidewall.

In embodiments, the sidewalls 126 may extend continuously from an open end of the first upturned portion 102B (open end of first upturned portion 102B depicted as shaded in FIG. 1A), across the central portion 102A, to the open end of the second upturned portion 102C (open end of first upturned portion 102C depicted as shaded in FIG. 1A). The distance 122 between the inner surfaces 127A and 127B of the sidewalls 126A and 126B, respectively, may have any dimension. In embodiments, the distance 122 between the inner surfaces 127A and 127B of the sidewalls 126A and 126B may be based, in whole or in part, on the thickness of the material used to form the enclosure sidewall to be inserted into the sidewall groove 120. In embodiments, the distance 122 between the inner surfaces 127A and 127B of the sidewalls 126A and 126B (i.e., the width of the sidewall groove 120) may be about: 0.1875" (3/16") or less; 0.25" (1/4") or less, 0.3125" (5/16") or less; 0.375" (3/8") or less; 0.4375" (7/16") or less; 0.5" (1/2") or less; or 0.75" (3/4") or less. In preferred embodiments, the sidewalls 126A and 126B may be formed parallel to each other such that the distance 122 between the inner surfaces 127A and 127B of the sidewalls 126A and 126B remains constant along the depth 124 of the sidewall groove 120. In embodiments, the sidewalls 126A and 126B may be formed skew to each other such that the distance 122 between the inner surfaces 127A and 127B of the walls 126A and 126B increases or decreases with the depth 124 of the sidewall groove 120.

The sidewalls 126A and 126B may have any thickness 128. In embodiments, the thickness 128 of the sidewalls 126A and 126B may be constant along the depth 124 of the sidewall groove 120. In other embodiments, the thickness 128 of the sidewalls 126A and 126B may vary with the depth 124 of the sidewall groove 120. For example, each of the sidewalls 126A and 126B may gradually or stepwise increase in thickness 128 approaching the closed bottom of the sidewall groove 120. In embodiments, the sidewalls 126A and 126B may have the same or a different a thickness 128 of about: 0.0625" (1/16") or less; 0.125" (1/8") or less; 0.1875" (3/16) or less; 0.25" (1/4") or less, 0.3125" (5/16") or less; or 0.375" (3/8") or less.

The sidewalls 126A and 126B may have any height to form a sidewall groove 120 having any depth 124. The depth 124 of the sidewall groove 120 may be based, at least in part, on the height, size, and/or thickness of the enclosure sidewall inserted into the sidewall groove 120. In embodiments, the depth 124 of the sidewall groove 120 may be based, at least in part, on the hardness or flexibility of the materials used to fabricate the attachment device 100. For example, the depth 124 of the sidewall groove 120 for a device 100 fabricated using one or more relatively harder or more resilient materials may be shorter than the depth 124 of the sidewall groove 120 of a device 100 using one or more relatively softer or less resilient materials. In embodiments, the sidewall groove 120 may have a depth 124 (i.e., the sidewalls 126A and 126B may have a height) of about: 0.25" (1/4") or less; 0.375" (3/8") or less; 0.50" (1/2") or less; 0.75" (3/4") or less; 1" or less; 1.25" (1 1/4") or less; 1.50" (1 1/2") or less; or 2" or less.

Two sidewalls 146A and 146B (collectively, "sidewalls 146") extend from a second surface 112B of a core member 112 to form the aquarium flange groove 140. Centerline 150 defines the centerline of the aquarium flange groove 140. The centerline 150 of the aquarium flange groove 140 defines an aquarium flange plane sidewall plane. In preferred embodiments, the sidewall plane and the aquarium flange plane may be coplanar (i.e., the sidewall flange centerline 130 and the aquarium flange centerline 150 are colinear). In other preferred embodiments, the sidewall plane and the aquarium flange plane may be non-coplanar (i.e., the sidewall flange centerline 130 and the aquarium flange centerline 150 are not colinear).

The aquarium flange groove 140 has an external width 141 (i.e., the width measured from the second surface 112B of the core member 112 in the first upturned portion 102B to the second surface 112B of the core member 112 in the second upturned portion 102C) to accommodate the slidable insertion of a flange extending from the inner surface of an aquarium frame (not shown in FIGS. 1A-1C). In embodiments, the sidewalls 146A and 146B may extend continuously from an open end of the second surface 112B of the first upturned portion 102B (depicted as shaded in FIG. 1A), across the second surface 112B of the central portion 102A, to the open end of the second surface 112B of the second upturned portion 102C (depicted as shaded in FIG. 1A).

The distance 142 between the inner surfaces 147A and 147B of the sidewalls 146A and 146B, respectively, may have any dimension. In embodiments, the distance 142 between the inner surfaces 147A and 147B of the sidewalls 146A and 146B may be based, in whole or in part, on the thickness of the material used to form the aquarium frame flange to be inserted into the aquarium flange groove 140. In embodiments, the distance 142 between the inner surfaces 147A and 147B of the sidewalls 146A and 146B (i.e., the width of aquarium flange groove 140) may be about: 0.1875" (3/16") or less; 0.25" (1/4") or less, 0.3125" (5/16") or less; 0.375" (3/8") or less; 0.4375" (7/16") or less; 0.5" (1/2") or less; or 0.75" (3/4") or less. In embodiments, the sidewalls 146A and 146B may be formed parallel to each other such that the distance 142 between the inner surfaces 147A and 147B of the sidewalls 146A and 146B remains constant along the depth 144 of the aquarium flange groove 140. In embodiments, the sidewalls 146A and 146B may be formed skew to each other such that the distance 142 between the inner surfaces 147A and 147B of the sidewalls 146 increases or decreases along the depth 144 of the aquarium flange groove 140.

The sidewalls 146A and 146B may have any thickness 148. The thickness 148 of sidewall 146A and the thickness 148 of sidewall 146B may be the same or different. In embodiments, the thickness 148 of the sidewalls 146A and 146B may be constant along the depth 144 of the aquarium flange groove 140. In other embodiments, the thickness 148 of the sidewalls 146A and 146B may vary along the along the depth 144 of the aquarium flange groove 140. For example, each of the sidewalls 146A and 146B may gradually or stepwise increase in thickness approaching the closed bottom of the aquarium flange groove 140. In embodiments, the sidewalls 146A and 146B may have a thickness 148 of about: 0.0625" (1/16") or less; 0.125" (1/8") or less; 0.1875" (3/16) or less; 0.25" (1/4") or less, 0.3125" (5/16") or less; or 0.375" (3/8") or less.

The sidewalls 146A and 146B may have any height to form an aquarium flange groove 140 having any desired depth 144. In embodiments, the depth 144 of the aquarium flange groove 140 may be based, at least in part, on the height, size, and/or thickness of the aquarium frame flange inserted into the aquarium flange groove 140. In embodiments, the depth 144 of the aquarium flange groove 140 may be based, at least in part, on the hardness or flexibility of the materials used to fabricate the device 100. For example, the depth 144 of the aquarium flange groove 140 in device 100 fabricated using one or more relatively harder or more resilient materials may be shorter or less than the depth 144 of the aquarium flange groove 140 in a device 100 using one or more relatively softer or less resilient materials. In embodiments, the aquarium flange groove 144 may have a depth 144 (i.e., the sidewalls 146A and 146B may have a height) of about: 0.25" (1/4") or less; 0.375" (3/8") or less; 0.50" (1/2") or less; 0.75" (3/4") or less; 1" or less; 1.25" (1 1/4") or less; 1.50" (1 1/2") or less; or 2" or less.

In embodiments, the sidewall groove centerline 130 and the aquarium flange centerline 150 may align. In other embodiments, the sidewall groove centerline 130 may be offset by a distance 152 from the aquarium flange centerline 150. In embodiments, the offset distance 152 may be based at least in part on the thickness of the enclosure sidewall to be inserted into the sidewall groove 120 and the thickness of the aquarium frame flange to be inserted into the aquarium flange groove 140. In at least some embodiments, the offset distance 152 may be determined such that the interior surface of the enclosure sidewall is disposed proximate the upper surface of the aquarium frame flange. In such embodiments, the offset distance 152 may be determined using the formula:

$$\text{Offset Distance} = \frac{\text{Enclosure Sidewall Thickness}}{2} + \frac{\text{Aquarium Frame Flange Thickness}}{2} \quad (1)$$

The attachment device 100 may be fabricated using one or more materials or combinations of materials. In at least some embodiments, the attachment device 100 may preferably be fabricated using a relatively flexible elastomeric material. Reference to an elastomeric material may be understood as including thermoplastic elastomeric materials or thermoset elastomeric materials. Preferably, such materials have the ability to elongate at least 10.0% and then substantially recover (i.e. recover 90% or more from their elongated state). Particular preferred materials include silicone elastomers which is reference to those elastomeric materials that are composed of silicon, carbon, hydrogen and oxygen, a preferred example of which includes poly(dimethylsiloxane). Another preferred elastomeric material includes what is known as ethylene propylene diene monomer (EPDM) elastomer, which is made from ethylene, propylene and a diene comonomer. In embodiments, the attachment device 100 may be fabricated using one or more materials having a Shore A durometer hardness range of about: 20 to 80; 30 to 70, 30 to 60; 30 to 50; or 40 to 70. Although the attachment device 100 has been depicted in FIGS. 1A-1C as having a generally straight central portion 102A, the central portion 102A of the device 100 is not limited to a straight portion and may, in various embodiments, include a polygonal central portion 102A, a curved central portion 102A, or an arched central portion 102A.

Figure 2A:
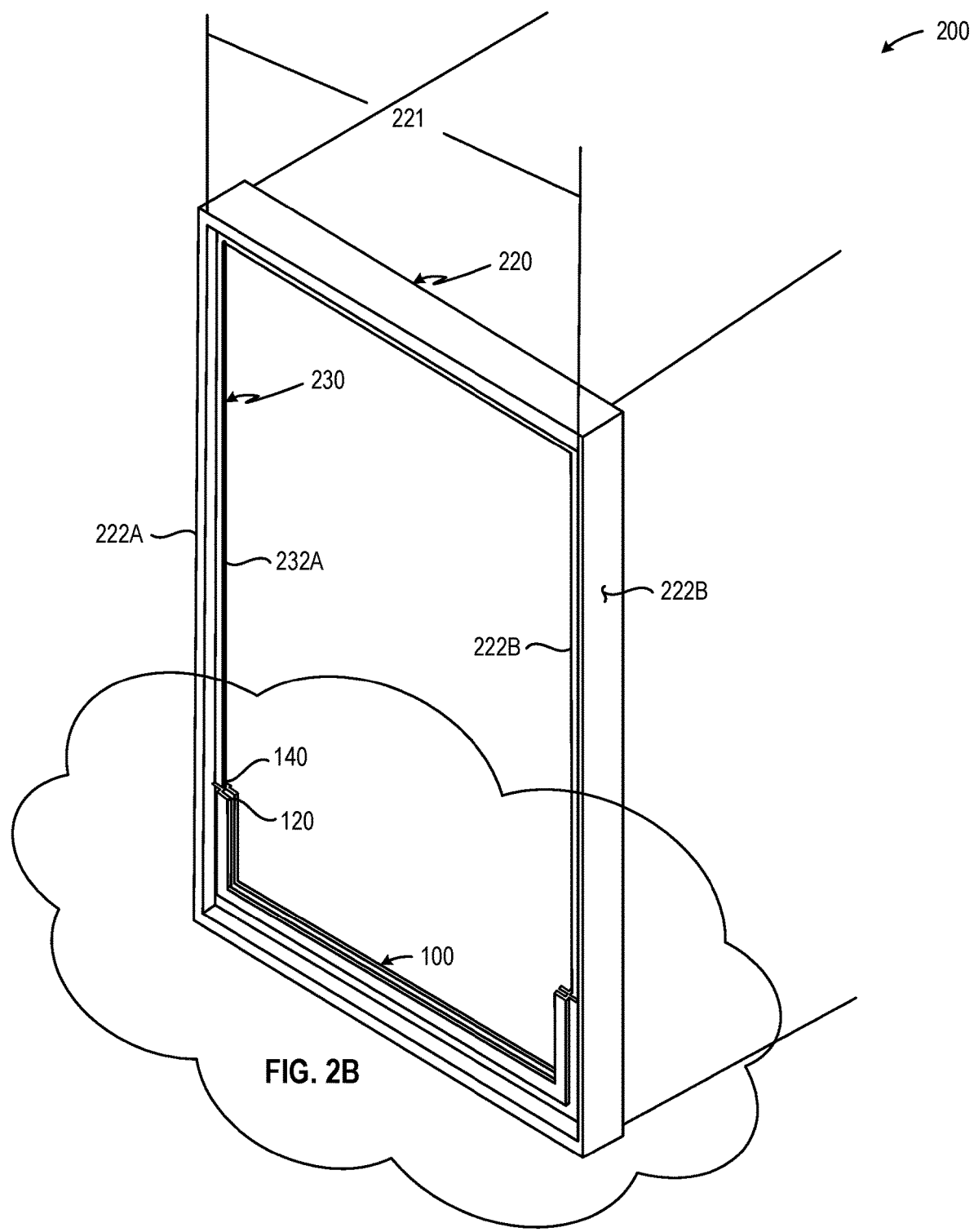
FIG. 2A is a perspective view of an illustrative system that includes a framed aquarium that includes a frame having a flange extending from at least a portion of the interior surface of the frame and having an attachment device, such as depicted in FIGS. 1A-1C in which at least a portion of the flange has been inserted into the aquarium flange groove of the attachment device, in accordance with at least one embodiment described herein.
Figure 2B:
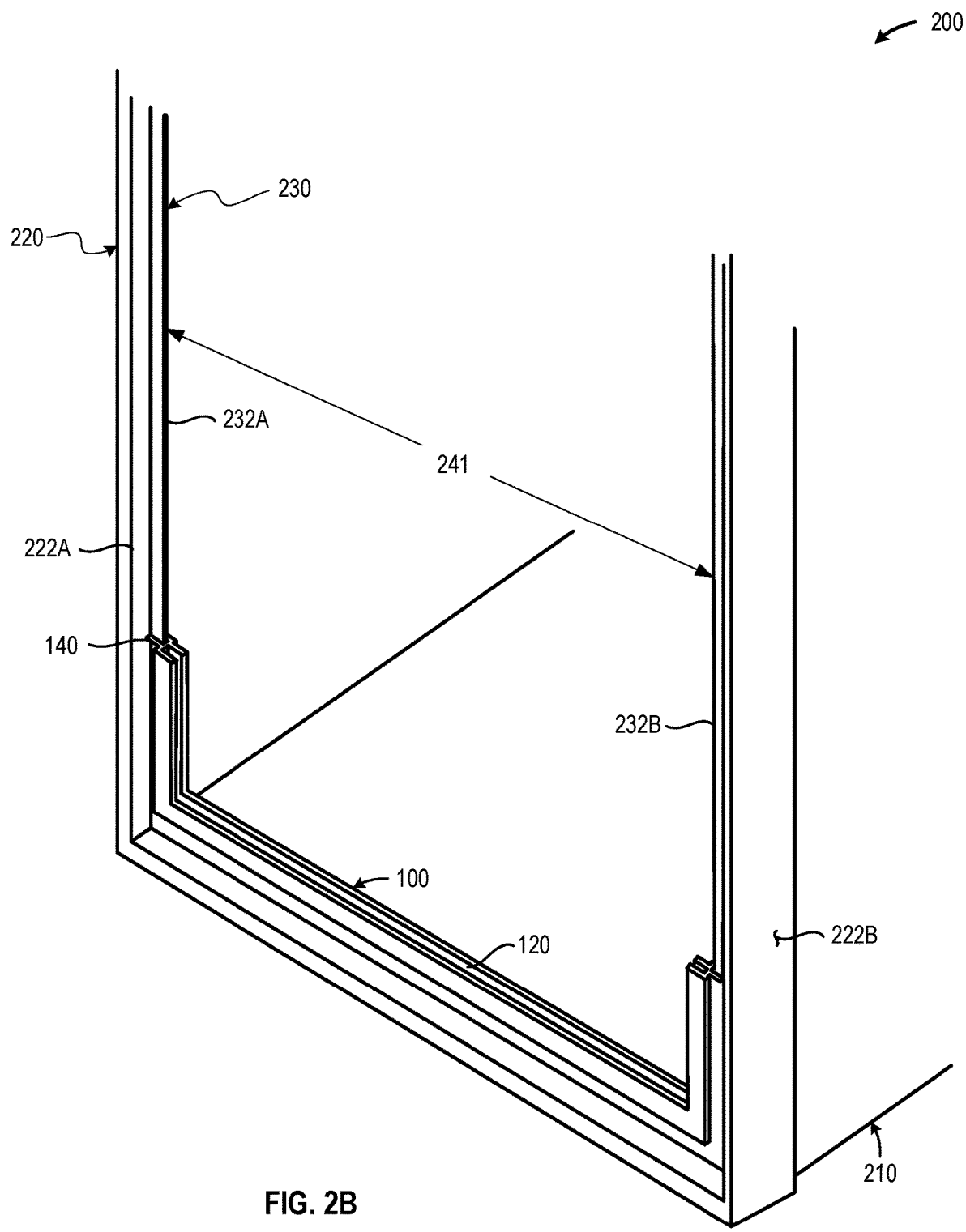
FIG. 2B is a close-up view of the illustrative system depicting the portion of the flange inserted into the aquarium flange groove of the attachment device, in accordance with at least one embodiment described herein.

FIG. 2A is a perspective view of an illustrative system 200 that includes a framed aquarium 210 that includes a frame 220 having a flange 230 extending from at least a portion of the interior surface of the frame 220 and having attachment device 100, such as depicted in FIGS. 1A-1C in which at least a portion of the flange 230 has been inserted into the aquarium flange groove 120 of the attachment device 100, in accordance with at least one embodiment described herein. FIG. 2B is a close-up view of the illustrative system 200 depicting the portion of the flange 230 inserted into the aquarium flange groove 120 of the attachment device 100, in accordance with at least one embodiment described herein.

Referring to both FIG. 2A and FIG. 2B, the framed aquarium 210 may be turned or rotated such that the open, framed, top of the aquarium is facing in the "forward" direction, such that the aquarium 210 now has a framed open side rather than a framed open top. The open side of the aquarium 210 has an internal flange-to-flange width 241 measured from the inner edge of the flange 232A on a first side 222A of the aquarium frame 220 to the inner edge of the flange 232B on the opposing second side 222B of the aquarium frame 220. The external width 141 of the attachment device 100 may be the same as or slightly less than the internal flange-to-flange width 241 of the aquarium flange 230. For example, the external width 141 of the attachment device 100 may be about: 0.625" (1/16") or less; 0.125" (1/8") or less; 0.1875" (3/16") or less; 0.25" (1/4") or less; or 0.375" (3/8") or less than the internal flange-to-flange width 241 of the aquarium frame 230. The aquarium frame 220 may have an internal frame width 221 measured from the inside surface of the first side 222A of the aquarium frame 220 to the inside surface of the opposed second side 222B of the aquarium frame 220.

The aquarium flange groove 140 of the attachment device 100 may be fitted, seated, or otherwise disposed on, across, over, or about at least a portion of the flange 230 extending from the frame 220 surrounding the open "side" of the aquarium 210. The central portion 102A of the attachment device 100 is proximate the "bottom" portion of the frame 220 of the open side of the aquarium 210. The flange 230 affixed to the bottom portion of the frame 220 is fitted, seated, or otherwise disposed in, into, under, or inside at least a portion of the aquarium flange groove 140 along the central portion 102A of the attachment device 100. The second portion 102B and the third portion 102C of the attachment device 100 extend vertically up the walls of the aquarium 210. The flange 230 affixed to the frame 220 extending along the vertical walls of the aquarium 210 is disposed in, into, under, or inside at least portion of the aquarium flange groove 140 along the second portion 120B and the third portion 102C of the attachment device 100. In embodiments, the aquarium flange groove 140 friction fits onto the flange 230 extending from the frame 220 of the attachment device 100.

Figure 3:
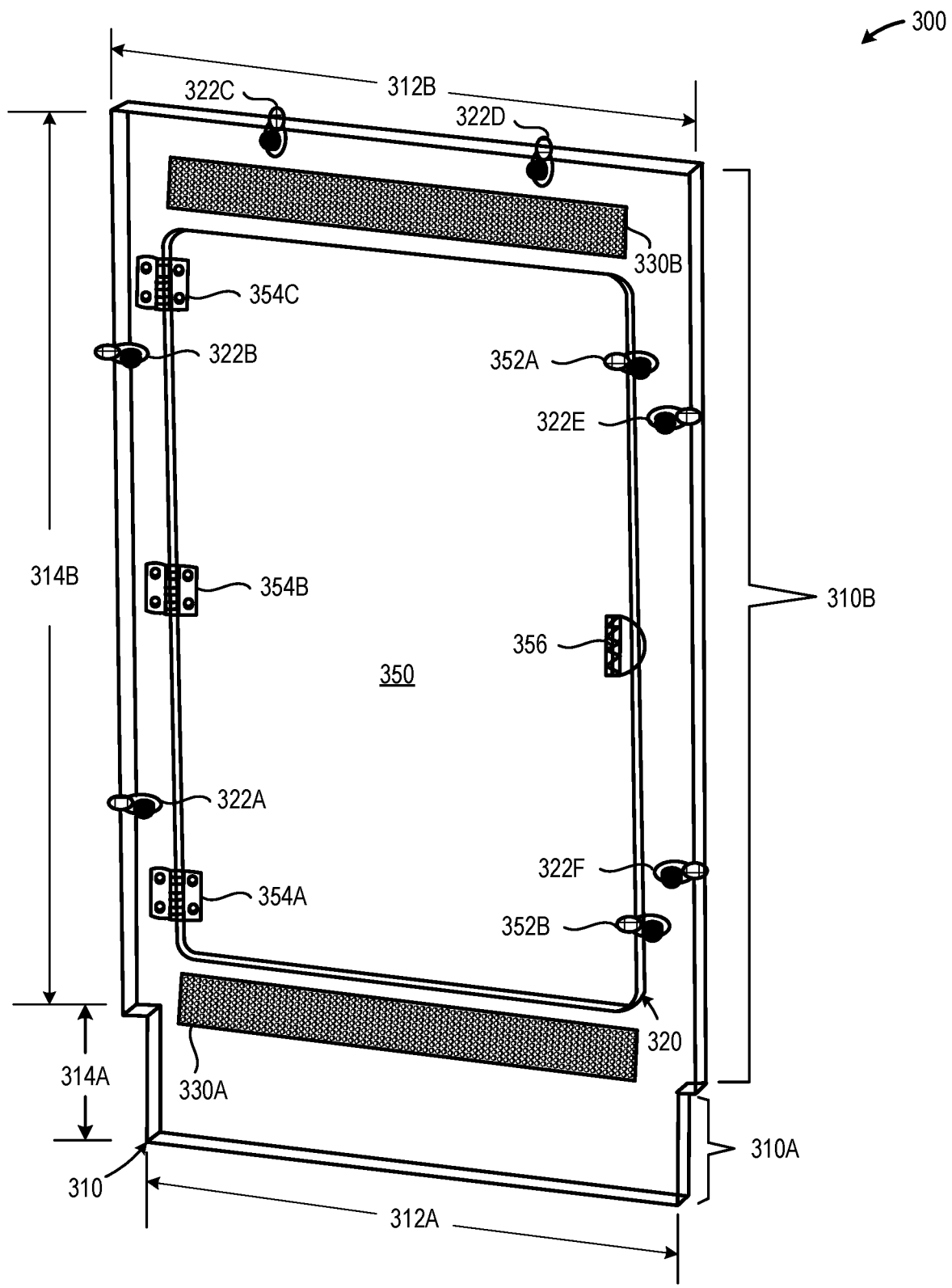
FIG. 3 is a perspective view of an illustrative enclosure sidewall that includes a sidewall member having an aperture formed therein and a door member disposed in the aperture and coupled to the sidewall member via a plurality of hinges, in accordance with at least one embodiment described herein.

FIG. 3 is a perspective view of an illustrative enclosure sidewall 300 that includes a sidewall member 310 having an aperture 320 formed therein and a door member 350 disposed in the aperture 320 and coupled to the sidewall member 310 via a plurality of hinges 354A-354C (collectively, "hinges 354"), in accordance with at least one embodiment described herein. The enclosure sidewall 300 includes a first plurality of ventilation apertures 330 and a second plurality of ventilation apertures 340. In embodiments, the first plurality of apertures 330 may be positioned close to the bottom of the sidewall member 310 and the second plurality of apertures 340 may be positioned close to the top of the sidewall member 310 thereby beneficially encouraging a vertical flow of air through the vivarium or terrarium.

The sidewall member 310 includes a first portion 310A having an external width 312A and a height 314A and a second portion 310B having an external width 312B and a height 314B. In embodiments, the width 312A of the first portion may be equal to or slightly less than the internal width 121 of the attachment device 100. For example, the internal width 141 of the attachment device 100 may be about: 0.625" (1/16") or less; 0.125" (1/8") or less; 0.1875" (3/16") or less; 0.25" (1/4") or less; or 0.375" (3/8") or less than the external width 312A of the first portion 310A of the sidewall member 310.

In embodiments, the sidewall member 310 may preferably be fabricated using one or more optically transparent materials. Such optically transparent materials include but are not limited to: one or more thermoplastic polymers (e.g., polycarbonate—such as LEXAN® or polymethylmethacrylate-such as PLEXIGLASS®. One may also utilize tempered or safety glass, or combinations thereof. The sidewall member 310 may have any physical size, shape, and/or geometric configuration. For example, the size of the sidewall member 310 may be selected based, at least in part on the overall height and width of the inside edge of the aquarium frame 220. The sidewall member 310 may have any width and any height. For example, the sidewall member 310 may have a height of about: 12" or more; 16" or more; 18" or more; 24" or more; 30" or more; 36" or more; 48" or more; 60" or more; or 72" or more. For example, the sidewall member 310 may have a width of about: 8" or more; 12" or more; 18" or more; 24" or more; 30" or more; or 36" or more. The sidewall member 310 may have any thickness. In at least some embodiments, the thickness of the sidewall member 310 may be based, at least in part, on the size of the sidewall member 350 and/or the rigidity of the materials used in fabrication of the sidewall member 310. In such embodiments, materials demonstrating a relatively greater rigidity and/or less elasticity may permit the use of a thinner material than materials demonstrating a relatively less rigidity and/or greater elasticity. In embodiments, the sidewall member 310 may have a thickness of about: 0.125" (1/8") or less; 0.25" (1/4") or less; 0.375" (3/8") or less; 0.50" (1/2") or less; 0.625" (5/8") or less; or 0.75" (3/4") or less. Although not depicted in FIG. 3, the sidewall member 310 may include one or more apertures to permit the passage of electrical wires, drip tubes, watering devices, feeding devices, and similar support equipment into the terrarium/vivarium.

In some embodiments, all or a portion of the first portion 310A of the sidewall member 310 may be fabricated using an optically translucent or even an opaque material. In some embodiments, an optically translucent or opaque layer or coating may be disposed in, on, about, or across some or all of the first portion 310A of the sidewall member 310. In some embodiments, all or a portion of the second portion 310B of the sidewall member 310 may be fabricated using an optically translucent or opaque material. In some embodiments, an optically translucent or opaque layer or coating may be disposed in, on, about, or across some or all of the second portion 310B of the sidewall member 310. For example, a translucent and/or an opaque layer may be applied to all or a portion of the perimeter of the second portion 310B of the sidewall member 310 to hide the aquarium frame flange 230 thereby providing a more consistent appearance through the enclosure sidewall 300.

The external width 312B of the second portion 310B of the sidewall member 310 may be the same as or slightly less than the internal frame width 221 of the aquarium frame 220 such that when the first portion 310A of the sidewall member 310 is inserted into the sidewall groove 120 of the attachment device 100 the inside surface of the periphery of at least a portion of the sidewall member 310 is disposed proximate at least a portion of the aquarium flange 230. For example, the external width 312B of the second portion 310B of the sidewall member 310 may be about: 0.625" (1/16") or less; 0.125" (1/8") or less; 0.1875" (3/16") or less; 0.25" (1/4") or less; or 0.375" (3/8") or less than the internal frame width 221 of the aquarium frame 220.

The enclosure sidewall 300 includes a plurality of sidewall attachment features 322A-322n (six 322A-322F are depicted in FIG. 3—collectively, "sidewall attachment features 322") that secure the enclosure sidewall 300 to the aquarium 210 by trapping the flange 230 between the respective sidewall attachment feature 322 and the sidewall member 310 thereby preventing the removal of the enclosure sidewall 300 from the aquarium frame 220. In at least some embodiments, the sidewall attachment features 322 may each include a latch or similar mechanical fastener that includes a rotatable element rotatably coupled to the sidewall member 310. A detent, void, or stopper element may be disposed proximate some or all of the sidewall attachment features to limit or otherwise restrict the rotation of the respective sidewall attachment feature 322. In embodiments, the rotating portion of the sidewall attachment features 322 that contacts the aquarium flange 330 may be sloped, tapered, cammed, or otherwise include a surface feature that tightens or clamps the sidewall member 310 to the aquarium flange 330 as the sidewall attachment feature 322 is rotated or otherwise engages the aquarium flange 330. In some instances, the sidewall member 310 may have a width equal to or slightly less than the internal flange-to-flange width 241 of the aquarium 210 and the sidewall attachment features 322 may be configured as a two sided attachment feature that traps the aquarium flange 230 between a first side and a second side of the attachment feature thereby holding the sidewall member 310 coplanar with the aquarium flange 230.

The enclosure sidewall 300 preferably includes a plurality of ventilation grids 330A-330n (only two such grids 330A and 330B are depicted in FIG. 3—collectively, "ventilation grids 330"), each having the same or a different number of apertures to permit ambient air to flow through the terrarium/vivarium. In embodiments, the apertures included in each of the ventilation grids 330 may have any number and/or combination of physical shapes. For example, the apertures included in each of the ventilation grids 330 may have one or more of the following physical shapes: circular, oval, polygonal, or combinations thereof. In embodiments, the size of each of the apertures included in each of the ventilation grids 330 may be selected based upon (a) the degree of ventilation required in the terrarium or vivarium; and (b) when present, the physical size of the occupants of the terrarium or vivarium. The apertures included in each of the ventilation grids 330 may be arranged in an evenly spaced pattern, or may be arranged in a free-form, random, or irregularly spaced arrangement. The any number apertures may be included in each of the ventilation grids 330. For example, each of the ventilation grids 330 may include: 100 or more apertures; 250 or more apertures; 500 or more apertures; or 1,000 or more apertures. In embodiments, the number of apertures included in the plurality of apertures 330 may be based, in whole or in part, on the size and/or expected number of occupants in the terrarium/vivarium and the physical size of the sidewall member 310. As depicted in FIG. 3, in at least some embodiments, a first ventilation grid 330A may be disposed beneath the door member 350 and a second ventilation grid 330B may be disposed above the door member 350—such an arrangement beneficially permits a vertical flow of air through the terrarium/vivarium.

The door member 350 may have any physical size and/or shape to match the size and/or shape of the aperture 320 formed in the sidewall member 310. In embodiments, one or more hinges 354A-354n (three, 354A-354C, depicted in FIG. 3—collectively, "hinges 354") rotatably couple the door member 350 to the sidewall member 310 to complete the enclosure sidewall 300. In addition, one or more door attachment features 352A-352n (two depicted in FIG. 3—collectively, "door attachment features 352") may prevent inadvertent opening of the door member 350. In embodiments, the door attachment features 352 may include a latch or similar rotatable fastener that, when rotated, prevents the door member 350 from opening. The hinges 354 may be disposed to permit the door member 350 to swing only outward, swing only inward, or swing bidirectionally. The hinges 354 may be physically coupled to the sidewall member 310 and to the door member 350 using any current or future developed technology, such as one or more chemical adhesives, one or more thermal adhesives, one or more thermal weldments, one or more removable fasteners, one or more non-removable fasteners, or any combination thereof.

In embodiments, the door member 350 may be fabricated using one or more optically transparent materials. Such optically transparent materials include but are not limited to: one or more thermoplastic polymers (e.g., polycarbonate—such as LEXAN® or polymethylmethacrylate such as PLEXIGLASS®). One may also employ tempered or safety glass, or combinations thereof. The door member 350 may have any physical size, shape, and/or geometric configuration. For example, the size of the door member 350 may be selected based, at least in part on the overall height and width of the sidewall member 310. In some embodiments, the size of the door member 350 may be based, at least in part, on the size and/or relative mobility of the occupants of the terrarium/vivarium. For example, a smaller aperture 320 and door member 350 may be preferable for skittish or fast-moving reptiles while a larger aperture 320 and door member 350 may be beneficial for terrariums using large pieces of landscaping or hardscaping. In some embodiments, one or more of the hinges 354 may be an "auto-close" or similar type hinge that biases the door member 350 toward the closed position. A handle 356 may be affixed to the door member 350 to provide a convenient handle for a user to open/close the door member 350. In some embodiments, the handle 356 may include a latching mechanism such that the door member 350 is maintained in a closed position when the door member 350 is closed. In some embodiments, a gasket or similar material may be used to at least partially seal between at least a portion of the perimeter of the door member 350 and the periphery of the aperture 320 in the sidewall member 310.

The door member 350 may have any width and any height. For example, the door member 350 may have a height of about: 4" or more; 6" or more; 8" or more; 10" or more; 12" or more; 18" or more; 24" or more; 30" or more; or 36" or more. For example, the door member 350 may have a width of about: 6" or more; 8" or more; 10" or more; 12" or more; 18" or more; or 24" or more.

The door member 350 may have any thickness. In at least some embodiments, the thickness of the door member 350 may be based, at least in part, on the size of the door member 350 and/or the rigidity of the materials used to fabricate the door member 350. In such embodiments, materials demonstrating a relatively greater rigidity and/or less elasticity may permit the use of a thinner material than materials demonstrating a relatively less rigidity and/or greater elasticity. In embodiments, the door member 350 may have a thickness of about: 0.125" (⅛") or less; 0.25" (¼") or less; 0.375" (⅜") or less; 0.50" (½") or less; 0.625" (⅝") or less; or 0.75" (¾") or less.

The door member 350 preferably includes a plurality of attachment features 352A-352n (two 352A and 352B are depicted in FIG. 3—collectively, "door attachment features 352") that secure the door member 350 to the sidewall member 310 thereby preventing the accidental or inadvertent opening of the door member 350. In at least some embodiments, the door attachment features 352 may each include a rotatable element that is rotatably coupled to the door member 350. A detent, void, or stopper element may be disposed proximate some or all of the door attachment features 352 to limit or otherwise restrict the rotation of the respective door attachment feature 352. In embodiments, some or all of the attachment features 352 may include members disposed on both sides of the sidewall member 310 such that the door member 350 cannot be rotated inward or outward.

Figure 4A:
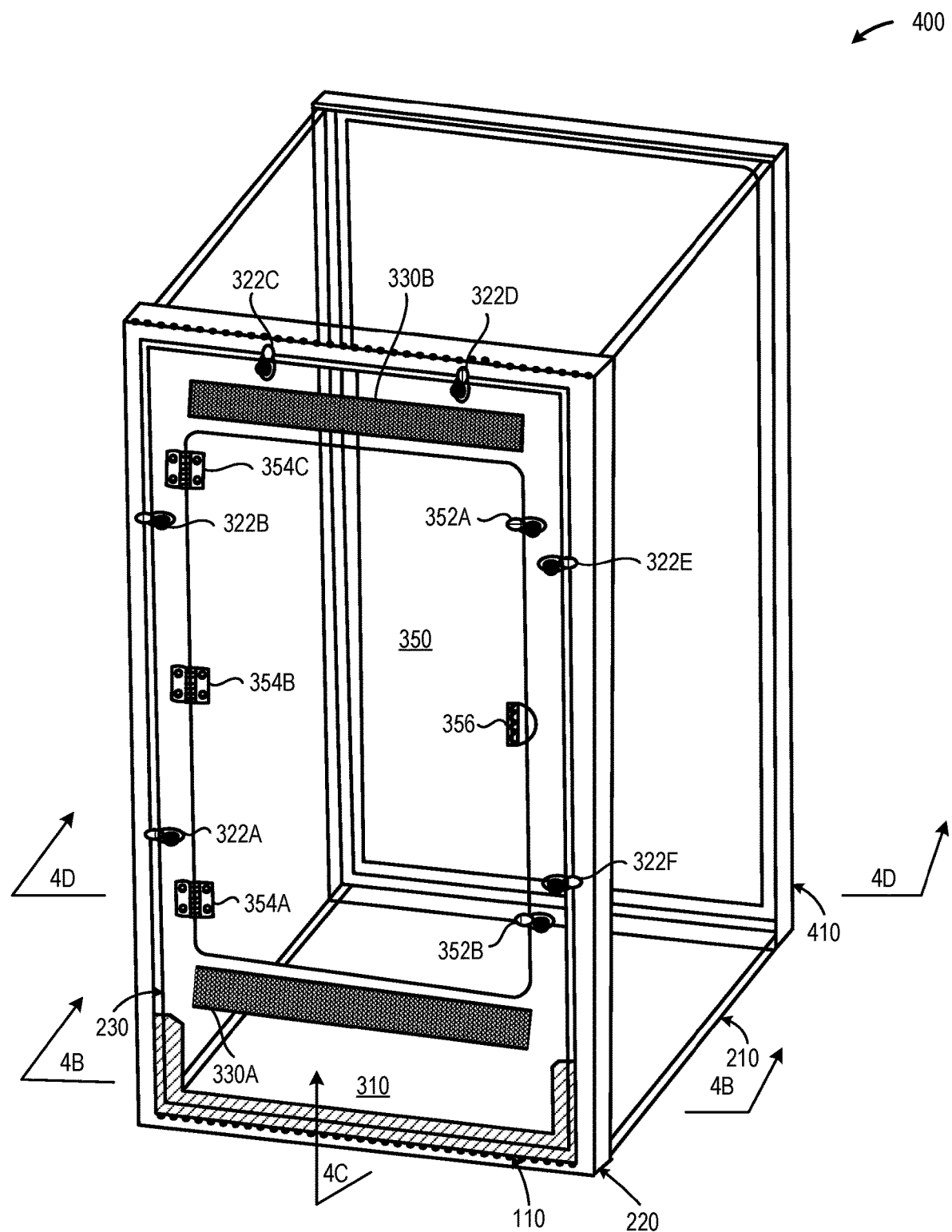
FIG. 4A is a perspective view of an illustrative terrarium/vivarium in which a sidewall enclosure, such as described in detail in FIG. 3, has been affixed to the open side of an aquarium using a plurality of sidewall latches, in accordance with at least one embodiment described herein.
Figure 4B:
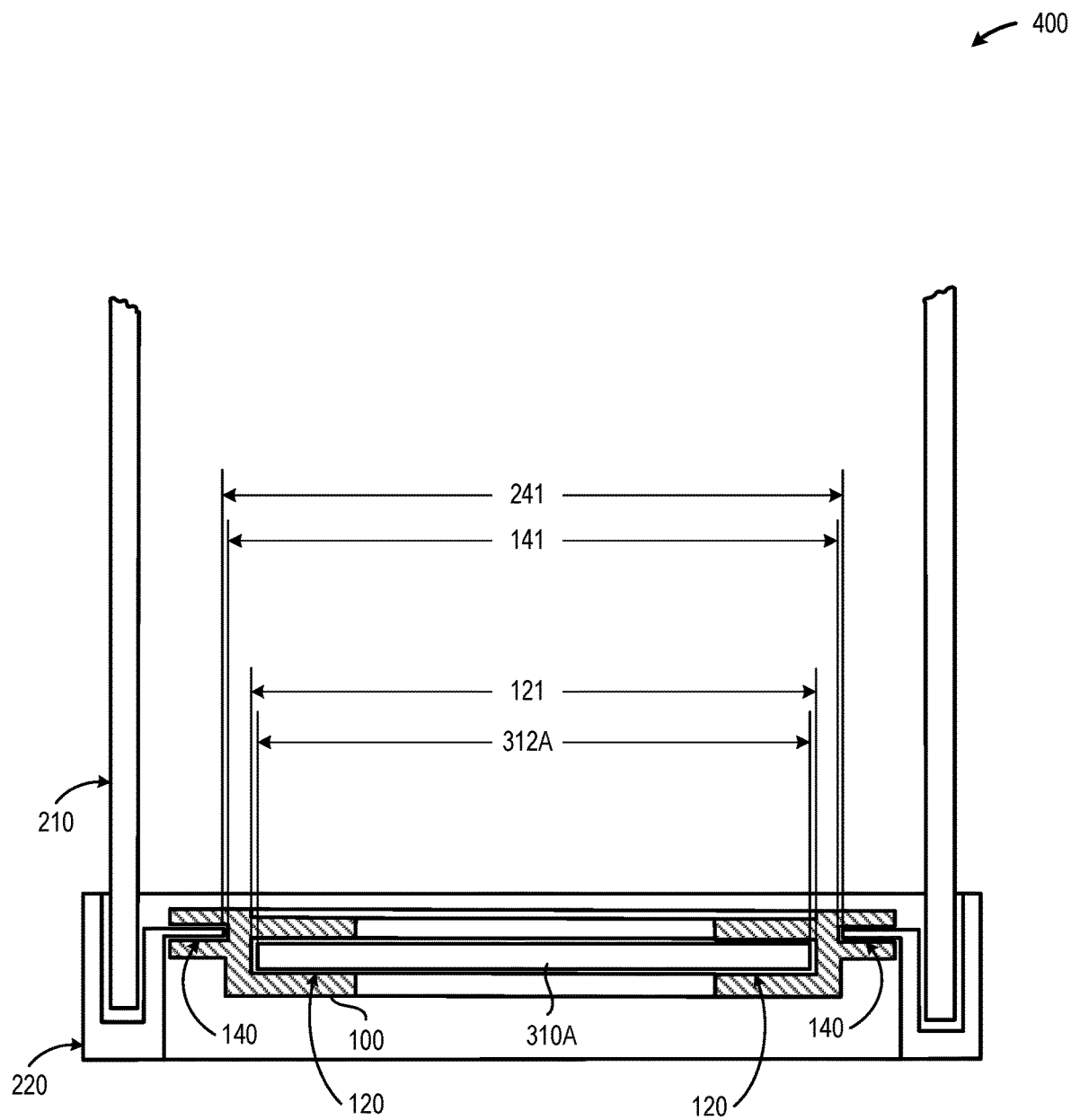
FIG. 4B is a cross-sectional plan view of the illustrative terrarium/vivarium depicted in FIG. 4A, along sectional line 4B-4B, in accordance with at least one embodiment described herein.
Figure 4C:
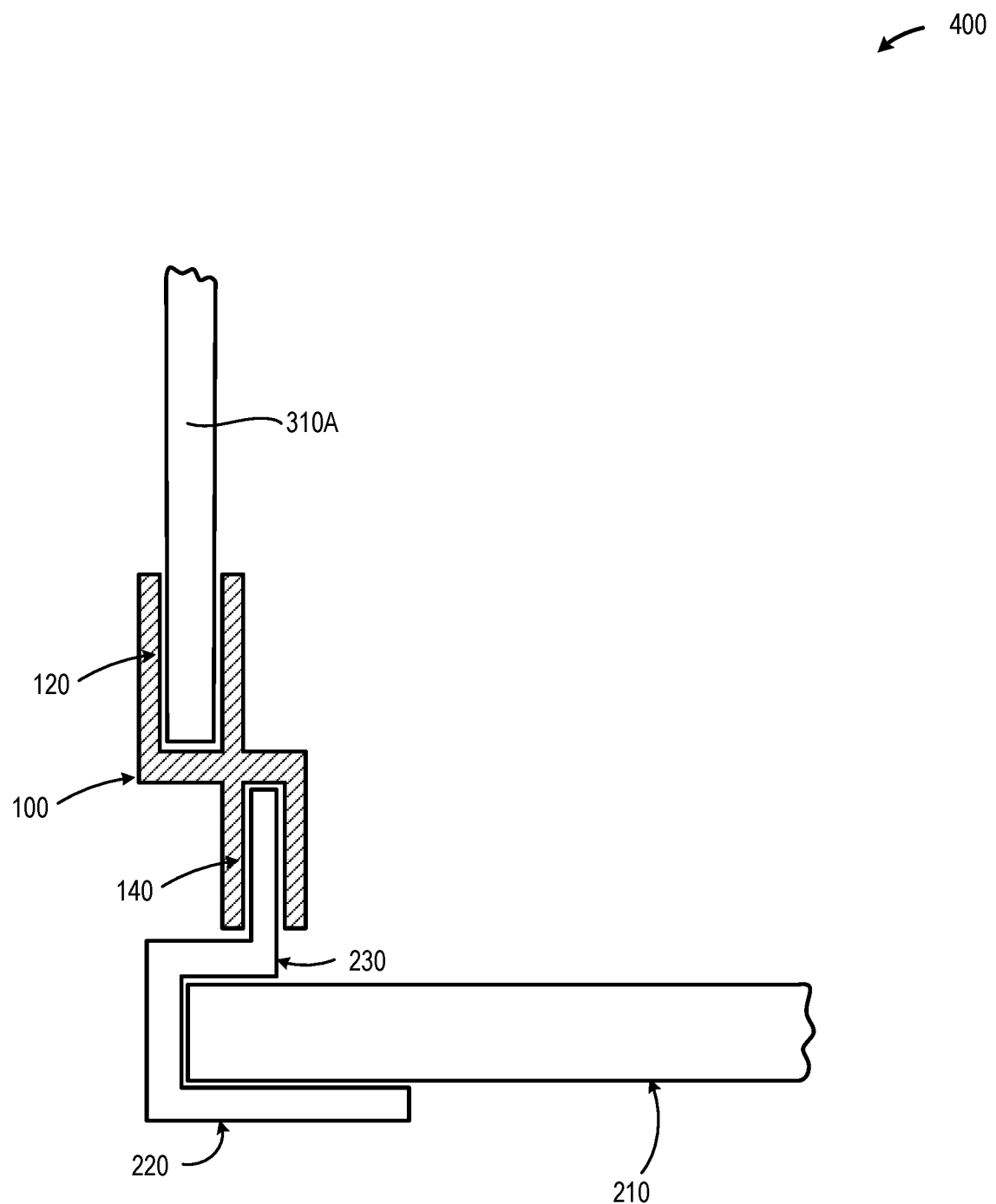
FIG. 4C is a cross-sectional elevation of the illustrative terrarium/vivarium depicted in FIG. 4A, along sectional line 4C-4C, in accordance with at least one embodiment described herein.
Figure 4D:
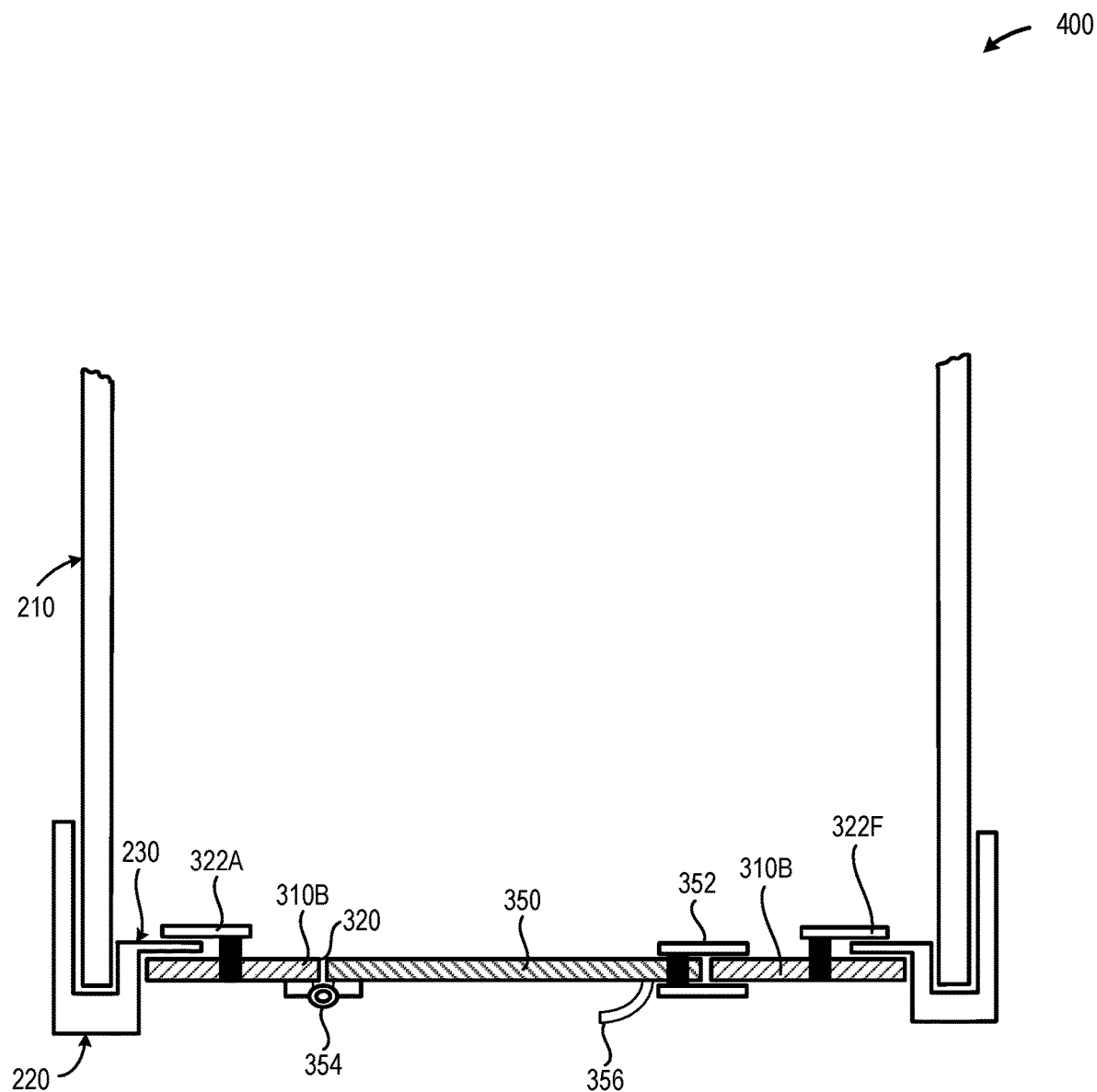
FIG. 4D is a cross-sectional plan view of the illustrative terrarium/vivarium depicted in FIG. 4A, along sectional line 4D-4D, in accordance with at least one embodiment described herein.
Figure 4E:
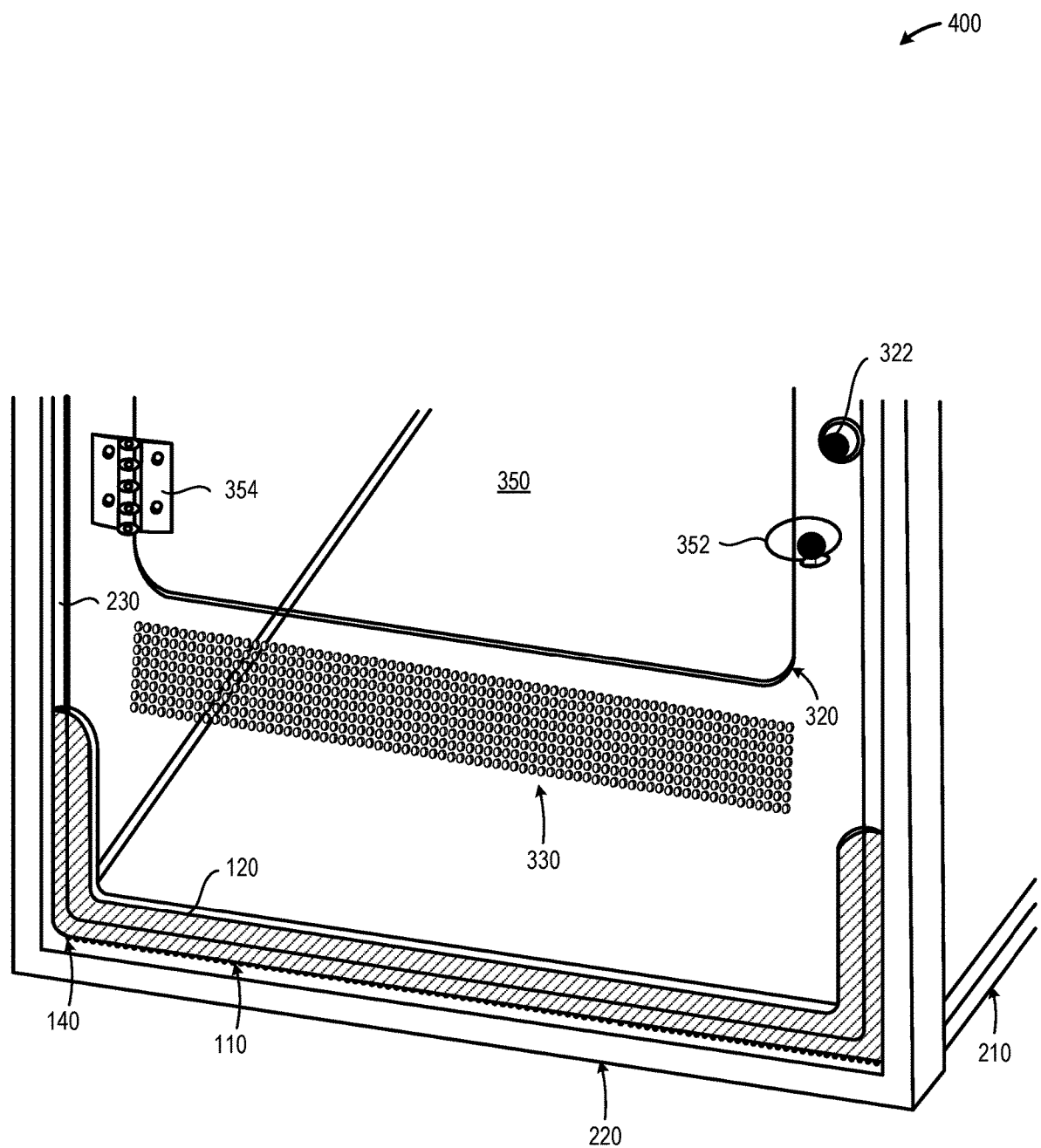
FIG. 4E is a partial perspective view of the lower portion of the enclosure sidewall depicted in FIG. 4A, in accordance with at least one embodiment described herein.

FIG. 4A is a perspective view of an illustrative terrarium/vivarium 400 in which a sidewall enclosure 300, such as described in detail in FIG. 3, has been affixed to the open side of an aquarium 210 using a plurality of sidewall attachment features 322A-322F, in accordance with at least one embodiment described herein. FIG. 4B is a cross-sectional plan view of the illustrative terrarium/vivarium 400 depicted in FIG. 4A, along cut line 4B-4B, in accordance with at least one embodiment described herein. FIG. 4C is a cross-sectional elevation of the illustrative terrarium/vivarium 400 depicted in FIG. 4A, along cut line 4C-4C, in accordance with at least one embodiment described herein. FIG. 4D is a cross-sectional plan view of the illustrative terrarium/vivarium 400 depicted in FIG. 4A, along cut line 4D-4D, in accordance with at least one embodiment described herein. FIG. 4E is a partial perspective view of the lower portion of the enclosure sidewall depicted in FIG. 4A, in accordance with at least one embodiment described herein.

Referring to FIGS. 4A-4E, in embodiments, the aquarium 210 may include a frame 410 disposed about the perimeter of the aquarium 210 opposite the sidewall enclosure (i.e., the "back" of the terrarium/vivarium). FIG. 4B depicts a cross-sectional plan view across the first portion 310A of the sidewall member 310. FIG. 4B illustrates the relationship between the attachment device 100, the aquarium flange 230 and the first portion 310A of the sidewall member 310. As depicted in FIG. 4B, the attachment device preferably 100 prevents the escape of substrate or other materials between the sidewall enclosure 300 and the aquarium frame 230. FIG. 4C depicts a cross-sectional elevation view of the aquarium frame 230 along the "bottom" of the sidewall enclosure. As in FIG. 4B, FIG. 4C illustrates the relationship between the attachment device 100, the aquarium flange 230 and the first portion 310A of the sidewall member 310. FIG. 4D depicts a cross-sectional plan view across the second portion 310B of the sidewall member 310 and the door member 350. As depicted in FIG. 4D, the sidewall attachment features 322 "trap" the aquarium flange 230 between the respective attachment feature and the inside surface of the sidewall member 310. The inner surface of the sidewall member 310 is disposed proximate the upper (or front) surface of the aquarium flange 230. Thus, the enclosure sidewall 300 is prevented from either falling into or falling out of the aquarium 210. FIG. 4E is a perspective view of the illustrative sidewall enclosure 300 disposed in the sidewall groove 120 of the attachment device 100 and the aquarium flange 230 disposed in the aquarium flange groove 140 of the attachment device 100.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An aquarium attachment device to attach a sidewall member to an aquarium, the aquarium attachment device comprising:

a flexible member that includes:
   a central portion having a first length along a first longitudinal axis;
   a first upturned end portion having a second length along a second longitudinal axis; and
   a second upturned end having a third length along a third longitudinal axis;
      wherein the central portion, the first upturned end portion, and the second upturned end portion form a core member having an interior surface and a transversely opposed exterior surface;
a sidewall groove having a first depth and a first width formed along at least a portion of the interior surface of the core member, the sidewall groove to accommodate the slidable insertion of at least a first portion of a sidewall member having a first thickness;
an aquarium flange groove having a second depth and a second width formed along the exterior surface of the core member, the aquarium flange groove to accommodate the slidable insertion of a framed aquarium flange having a second thickness;
   wherein a first plane formed by the centerline of the sidewall groove and a second plane formed by the centerline of the aquarium flange groove are offset.

2. The attachment device of claim 1 wherein the first longitudinal axis, the second longitudinal axis and the third longitudinal axis are coplanar.

3. The attachment device of claim 1 wherein the first upturned portion and the second upturned portion are parallel.

4. The attachment device of claim 1 wherein the second longitudinal axis forms a 90° angle with respect to the first longitudinal axis and the third longitudinal axis forms a 90° angle with respect to the first longitudinal axis.

5. The attachment device of claim 1 wherein the second longitudinal axis forms an angle other than 90° with respect to the first longitudinal axis.

6. The attachment device of claim 1 wherein the third longitudinal axis forms an angle other than 90° with respect to the first longitudinal axis.

7. The attachment device of claim 1 wherein the first length is greater than the second length and the third length.

8. The attachment device of claim 1 wherein the second length and the third length are approximately equal.

9. An aquarium system to convert a framed open top aquarium to a front-opening terrarium/vivarium, the aquarium system comprising:

an enclosure sidewall that includes:
   a sidewall member;
   at least one door aperture formed in the sidewall member;
   an outward opening, door member pivotably coupled to the sidewall member and disposed at least partially in the door aperture when in a closed position; and
an attachment device that includes:
   a central portion having a first length along a first longitudinal axis, a first upturned end portion having a second length along a second longitudinal axis, and a second upturned end portion having a third length along a third longitudinal axis that form a core member having an interior surface and a transversely opposed exterior surface;
   a sidewall groove that extends along at least a portion of the interior surface of the core member, the sidewall groove having a first depth and a first width to accommodate the slidable insertion of at least a portion of a peripheral edge of a first portion of the sidewall member; and an aquarium flange groove formed along the at least a portion of the exterior surface of the core member, the aquarium flange groove having a second depth and a second width to accommodate the slideable insertion of at least a portion of a framed aquarium flange that extends from an interior surface of a frame disposed about an aquarium.

10. The system of claim 9 wherein the first longitudinal axis, the second longitudinal axis and the third longitudinal axis are coplanar.

11. The system of claim 9 wherein the first upturned portion and the second upturned portion are parallel.

12. The system of claim 9 wherein the second longitudinal axis forms a 90° angle with respect to the first longitudinal axis and the third longitudinal axis forms a 90° angle with respect to the first longitudinal axis.

13. The system of claim 9 wherein the second longitudinal axis forms an angle other than 90 degrees with respect to the first longitudinal axis.

14. The system of claim 9 wherein the third longitudinal axis forms an angle other than 90 degrees with respect to the first longitudinal axis.

15. The system of claim 9 wherein a second portion of the sidewall member further comprises:
    a first ventilation grid that includes at least one aperture formed through the sidewall member; and
    a second ventilation grid that includes at least one aperture formed through the sidewall member.

16. The system of claim 9 wherein the sidewall member comprises polycarbonate.

17. The system of claim 9 wherein the attachment device comprises an elastomeric material.

18. The system of claim 9 wherein the first length is greater than the second length and the third length.

19. The system of claim 9 wherein a first plane formed by the centerline of the sidewall groove and a second plane formed by the centerline of the aquarium flange groove are offset.

20. The system of claim 19 wherein the sidewall member further comprises:
    a first sidewall portion having a first width to slidably insert into the sidewall groove of the attachment device; and
    a second sidewall portion having a second width, greater than the first width.

21. The system of claim 20 wherein the enclosure sidewall further comprises:
    a plurality of attachment features disposed about the periphery of an internal surface of the second portion of the sidewall member, each of the plurality of attachment features to engage an internal surface of an inward facing peripheral frame opposite an external surface of the inward facing peripheral frame proximate the second portion of the sidewall member.

22. The system of claim 9 wherein a first plane formed by the centerline of the sidewall groove and a second plane formed by the centerline of the aquarium flange groove are coplanar.

23. The system of claim 22 wherein the sidewall member further comprises:
    a first sidewall portion to slidably insert into the sidewall groove of the attachment device; and
    a second sidewall portion disposable proximate at least a portion of an edge of at least a portion of the framed aquarium flange when the first portion of the sidewall member is inserted into the sidewall groove of the attachment device.

24. The system of claim 23 wherein the enclosure sidewall further comprises:
    a first plurality of attachment features disposed about the periphery of an internal surface of the second portion of the sidewall member, each of the first plurality of attachment features to engage an internal surface of the inward facing peripheral frame; and
    a second plurality of attachment features disposed about the periphery of an external surface of the second portion of the sidewall member, each of the second plurality of attachment features to engage an external surface of an inward facing peripheral frame opposite the internal surface of the inward facing peripheral frame.

25. An aquarium attachment device to attach a sidewall member to an aquarium, the aquarium attachment device comprising:
    a flexible member that includes:
        a central portion having a first length along a first longitudinal axis;
        a first upturned end portion having a second length along a second longitudinal axis; and
        a second upturned end having a third length along a third longitudinal axis;
            wherein the central portion, the first upturned end portion, and the second upturned end portion form a core member having an interior surface and a transversely opposed exterior surface;
    a sidewall groove having a first depth and a first width formed along at least a portion of the interior surface of the core member, the sidewall groove to accommodate the slidable insertion of at least a first portion of a sidewall member having a first thickness;
    an aquarium flange groove having a second depth and a second width formed along the exterior surface of the core member, the aquarium flange groove to accommodate the slidable insertion of a framed aquarium flange having a second thickness;
        wherein a first plane formed by the centerline of the sidewall groove and a second plane formed by the centerline of the aquarium flange groove are coplanar.

* * * * *